United States Patent [19]
Burris et al.

[11] Patent Number: 5,811,477
[45] Date of Patent: *Sep. 22, 1998

[54] METHOD FOR PREPARING IMPROVED ASPHALT EMULSION COMPOSITIONS

[75] Inventors: Michael V. Burris, 5169 Bella Collina St., Oceanside, Calif. 92056; Bryan B. Burris, Oceanside, Calif.

[73] Assignee: Michael V. Burris, Oceanside, Calif.

[ * ] Notice: The term of this patent shall not extend beyond the expiration date of Pat. No. 5,539,029.

[21] Appl. No.: 687,770

[22] Filed: Jul. 26, 1996

Related U.S. Application Data

[63] Continuation of Ser. No. 412,560, Mar. 29, 1995, abandoned, which is a continuation-in-part of Ser. No. 389,623, Feb. 21, 1995, Pat. No. 5,539,029, which is a continuation of Ser. No. 212,034, Mar. 11, 1994, abandoned.

[51] Int. Cl.⁶ .............................. C08L 95/00; C08J 11/04
[52] U.S. Cl. ........................... 524/60; 521/41; 521/44.5; 524/68; 524/69; 524/71
[58] Field of Search ........................ 521/40.5, 41, 44.5, 521/45; 524/59, 60, 61, 68, 69, 71; 404/32

[56] References Cited

U.S. PATENT DOCUMENTS

| | | |
|---|---|---|
| 2,700,655 | 1/1955 | Endres . |
| 3,284,397 | 11/1966 | Johnston . |
| 3,891,585 | 6/1975 | McDonald . |
| 3,900,692 | 8/1975 | Rostler . |
| 3,919,148 | 11/1975 | Winters et al. . |
| 4,018,730 | 4/1977 | McDonald . |
| 4,021,393 | 5/1977 | McDonald . |
| 4,041,712 | 8/1977 | Stepien, Jr. et al. . |
| 4,069,182 | 1/1978 | McDonald . |
| 4,073,659 | 2/1978 | Burris . |
| 4,137,204 | 1/1979 | McDonald ................................ 524/71 |
| 4,193,816 | 3/1980 | Ferm et al. ............................. 106/277 |
| 4,211,575 | 7/1980 | Burris . |
| 4,298,397 | 11/1981 | Burris . |
| 4,332,705 | 6/1982 | Uffner ....................................... 524/71 |
| 4,492,781 | 1/1985 | Doszak et al. ............................ 524/71 |
| 4,548,962 | 10/1985 | Lindmark . |
| 4,564,310 | 1/1986 | Thalen et al. ............................. 404/32 |
| 4,609,696 | 9/1986 | Wilkes . |
| 4,621,108 | 11/1986 | Burris ....................................... 524/71 |
| 5,151,456 | 9/1992 | Elias . |
| 5,180,428 | 1/1993 | Koleas . |

FOREIGN PATENT DOCUMENTS

| | | |
|---|---|---|
| 0013603 | 1/1991 | Japan . |
| 0609819 | 6/1978 | U.S.S.R. ................................. 521/41 |
| 1143753 | 3/1985 | U.S.S.R. ................................. 524/68 |

*Primary Examiner*—Peter A. Szekely
*Attorney, Agent, or Firm*—Jerry R. Seiler, Esq.

[57] ABSTRACT

A method of preparing an asphalt emulsion composition comprises mixing an aqueous asphalt emulsion, water, latex rubber, and a solids mix composition comprising reclaimed rubber particles passing through a 40 mesh U.S. series sieve and one or more solid addends selected from the group consisting of a rheological agent, gilsonite, carbon black, surface active clay and polymer fibers, and mixtures thereof and wherein the ratio of latex rubber:rubber particles is between about 1:1 and about 1:10, by weight, respectively, and mixing the components at substantially ambient temperature.

75 Claims, No Drawings

METHOD FOR PREPARING IMPROVED ASPHALT EMULSION COMPOSITIONS

This application is a continuation of U.S. patent application Ser. No. 08/412,560, filed Mar. 29, 1995, now abandoned which was a continuation-in-part of U.S. patent application Ser. No. 08/389,623, filed Feb. 21, 1995, now U.S. Pat. No. 5,539,029 which was a continuation of U.S. patent application Ser. No. 08/212,034, filed Mar. 11, 1994, now abandoned.

BACKGROUND OF THE INVENTION

In the aforesaid U.S. Pat. No. 5,539,029 there is disclosed a method of preparing an asphalt emulsion-rubber paving composition in which the components, including an aqueous asphalt emulsion, water, latex rubber and rubber particles, are mixed at ambient temperatures to form a homogenous liquid composition which is blended with aggregate at ambient temperatures to form a paving composition which provides a paving surface having improved skid resistance. The method and compositions described in the aforesaid application are incorporated herein by reference. The aforesaid method is a substantial improvement over previous methods of preparing asphalt-rubber compositions using rubber particles which required hot-mix conditions at temperatures above 300° F., and typically above 350° F., resulting in significant volatilization of rubber components including elemental sulphur, which forms highly toxic and undesirable hydrogen sulfide. Such hot-mix processing is impractical and/or unacceptable where environmental standards and air pollution controls restrict or prevent such methods.

SUMMARY OF THE INVENTION

According to the present invention, useful asphalt emulsion compositions are prepared by mixing an aqueous asphalt emulsion at ambient temperatures with latex rubber, rubber particles and/or particulate reclaimed rubber products, and optionally polymer fibers. The compositions may also include one or more of gilsonite, added sulfur, a thickener, a surface active clay, carbon black, graphite, aggregate and recycled asphaltic concrete particles. In a preferred embodiment a solids mix composition, preferably in the form of an aqueous slurry of the aforesaid components, without the aqueous asphalt emulsion and aggregate, is separately prepared, and then blended with the aqueous asphalt emulsion, and with aggregate.

DETAILED DESCRIPTION OF THE INVENTION

The aqueous asphalt emulsion used in the asphalt emulsion compositions of the invention comprises an asphalt phase emulsified in a water phase utilizing a suitable emulsifier which may be cationic, anionic or nonionic. Where the emulsion product is to be used for paving, a preferred emulsion utilizes a paving grade asphalt, also referred to in the art as an "aged residue" (AR) grade and as penetration grade asphalt. Commonly used asphalts of this type are AR-1000, AR-2000, AR-4000, AR-8000, and AR-16000, the numerical designations being the median asphalt viscosity at 140° F. (60° C.) in poises after aging. These penetration grade asphalts have a penetration above about 10 and up to about 300 dmm at 77° F. (25° C.), 100 g/5 sec. (ASTM D-5 or AASHO T-49). The specific asphalt penetration selected will depend on the type of emulsion which is to be produced as well as its ultimate use. For example, in producing a slurry emulsion or chip seal emulsion, asphalt penetrations are preferably about 50–70 dmm. Although penetration or paving (AR) grade asphalts may be preferred, especially where the ultimate use of the composition is for paving, liquid asphalts may be used for certain applications. The liquid asphalts comprise paving grade asphalts which have been cut back with naphtha, kerosene, gas oil, or other light hydrocarbon oils preferably with high maltene contents to produce rapid curing (RC), medium curing (MC), or slow curing (SC) liquid asphalts. Air blown or oxidized asphalts may also be used.

Where the final compositions are to be used for paving preferred asphalt emulsion compositions are anionic emulsions, further classified by the rate of setting of the emulsion, i.e., the rate at which the dispersed asphalt particles will recombine and form a continuous film of asphalt cement. SS (slow setting), MS (medium setting), or AQS (quick set) emulsions may be used. Such anionic emulsions have a viscosity SSF (Soybolt-Furol viscosity) at 77° F. (25° C.) sec. of between about 20 and 100 (ASTM Test D88), and a distillation residue penetration at 77° F. of between about 40 and about 90 dmm (ASTM tests D244 and D5, AASHO T49). Useful anionic emulsifiers include petroleum sulfonates such as alphaolefin sulfonates or sulfates, soap-type emulsifying agents, typically the alkali metal salts of higher fatty acids such as lauric, myristic, palmitic, oleic, ricinoleic and linoleic acids, or mixtures of acids available from animal or vegetable oils. Other examples of anionic emulsifiers are described in U.S. Pat. No. 4,282,037, the description of which is incorporated herein by reference. A preferred SS-1h anionic emulsifier comprises a rosin acid soap, particularly a Vinsol® resin soap or other sulfonated lignin derivatives.

Alternatively, the asphalt emulsion may be a nonionic emulsified composition using emulsifiers including long chain polyoxyethylene or polyoxypropylene groups in fatty acid, alcohol, amide, or amine molecules. These emulsifiers do not ionize but acquire their hydrophilic characteristics from oxygenated side chains, i.e., polyoxyethylene or polyoxypropylene chains combined with the oil-soluble fatty acid, alcohol amine or amide component of the molecule. More specific descriptions of such emulsifiers are also disclosed in aforesaid U.S. Pat. No. 4,282,037, incorporated herein by reference.

The aqueous asphalt emulsions may alternatively be cationic emulsions commonly identified as CSS, CMS or CRS, again designating the rate of setting. Useful cationic emulsifiers include amines, quartary ammonium halides, alkyl-substituted imidazolines, and particularly those described in U.S. Pat. No. 4,298,397, the descriptions of which are incorporated herein by reference. The emulsifiers are typically used in concentrations of between about 0.05% and about 5%, by weight, of the aqueous asphalt emulsion.

The asphalt phase of the aqueous asphalt emulsion may also contain gilsonite. A preferred gilsonite is one having a melting or softening point near about 300° F. The gilsonite is preferably blended with the asphalt prior to preparation of the aqueous asphalt emulsion. One such process is described in U.S. Pat. No. 4,073,659, incorporated herein by reference, in which gilsonite is melted, the asphalt heated, and the two materials then blended at the gilsonite melting point temperature. Alternatively, gilsonite particles of a size range which can be easily physically mixed with the asphalt by stirring or similar agitation may be blended with the asphalt without the use of heat. Where the ultimate emulsion is to be used for paving, the preferred ratio of asphalt:gilsonite is between about 99:1 and about 5:95, by weight, respectively.

However, the gilsonite may also, or alternatively be added as part of the solids mix composition that is blended with the aqueous asphalt emulsion and explained hereinafter.

Sulfur may also be used in preparing the aqueous asphalt emulsion. Sulphur may be blended with asphalt and a liquid hydrocarbon and the mixture emulsified to produce the aqueous asphalt emulsion as disclosed in U.S. Pat. Nos. 4,211,575 and 4,298,397, the descriptions of which are incorporated herein by reference. Pursuant to the methods disclosed in the aforesaid patents, the sulfur and asphalt or liquid asphalt, may be mixed at a high temperatures, above the melting point of sulfur, but below a critical temperature at which chemical reaction between the sulfur and asphalt occurs. The amount of sulfur added is between about 1% and about 10%, by weight, over the amount of any residual sulfur in the asphalt. The liquid hydrocarbons are petroleum hydrocarbons having a boiling point above about 200° F. and may be used in amounts between about 1% and about 35%, by weight, of the asphalt phase.

The asphalt phase, comprising asphalt and optionally gilsonite and/or sulfur as previously described, is emulsified with water utilizing one or more anionic, cationic or non-ionic emulsifiers. The preparation of the aqueous asphalt emulsion is well understood by those skilled in the art. Typically, the asphalt solids phase of the aqueous asphalt emulsion is over about 50% by weight, preferably about 50% to about 75%, of the total asphalt emulsion, with the water phase making up the remainder of the emulsion, and containing between about 0.05% and about 10%, by weight, of the emulsifier. The ratio of the asphalt phase:water phase, is between about 1:2 and about 3:1, respectively, by weight, with the specific amount of water phase depending somewhat on the final use, or otherwise as desired.

Another ingredient of the asphalt emulsion composition of the invention is latex rubber. The rubber latex material comprises a rubber emulsion or latex in which small globules or particles of natural or synthetic rubber are suspended in water with emulsifying agents. The preferred rubber is styrene-butadiene (SBR), neoprene, or natural rubber. SBR latexes normally have a major amount of rubber present. For example, a commercially available SBR material contains about 68–70% rubber and about 30% water. The SBR rubber may also be cross-linked, for example, with carboxylate groups resulting from treatment with methacrylic acid, or the like. Styrene-butadiene-styrene block copolymers sold under the registered trademarks Kraton® or Hytrel® may be used. Commercially available neoprene latexes have a solids content of about 35%, while a commercially available natural rubber latex has about 60% rubber. Other useful rubber and non-rubber polymer latexes include acrylic, vinylacrylic, acrylic terpolymers, nitrile, polyvinyl alcohol, polyvinyl acetate, vinyl acetate-ethylene, vinyl ester copolymers, ethylene vinyl chloride, polyvinylidene chloride, butyl rubber, acrylonitrile-butadiene, polyurethanes, silicones, and block copolymers such as styrene-isoprene (SIS), styrene-ethylene-vinyl acetate (SEVAS) and styrene acrylate. The latex may be mixed with the above-described aqueous asphalt emulsion as described in the aforesaid application Ser. No. 08/212,034. Alternatively, the latex may be blended with a solids mix composition described below, or it may be added separately at the time the aqueous asphalt emulsion and solids mix composition are blended.

The above-described aqueous asphalt emulsion is blended with a solids mix composition comprising rubber particles and/or other particulate recycled or reclaimed rubber tire products. Again, the latex rubber may also or instead be added and blended as part of the solids mix composition, unless it is present in the aqueous asphalt emulsion, or is to be added separately later. Rubber particles such as those obtained by grinding used rubber tires to relatively small particle sizes, preferably at least a portion of which will pass through a 30 or 40 mesh U.S series sieve may be used. Alternatively, the rubber particles added as part of the solids mix composition may be substantially only rubber particles such as obtained from used rubber tires, but which particles contain relatively small amounts of fibers, if any. Such rubber particles are recovered from used tires by grinding, stripping or otherwise cutting away the old tread part of the tire from the sidewall shell or carcass, and grinding the rubber to a desired particle size, preferably passing a 20 mesh U.S. series sieve and more preferably passing a 40 mesh sieve. As an alternative or in addition to the aforesaid rubber particles, the rubber ingredient of the solids mix comprises particulate solid reaction products obtained by processing reclaimed rubber, especially used rubber tires, to remove volatiles such as hydrocarbon gases, oils and further separating out metals and fibers. Known methods include catalyzed processes carried out at elevated temperatures, above 300° F., resulting in ash and carbon black particles, which may be used as a portion or all of the rubber component of the solids mix. Known proprietary commercial processes utilize temperatures above about 400° F. to heat shredded tires in the presence of catalysts. Commercially obtained particles from such processing are small, typically 50% of which pass a 50 mesh U.S. series sieve. Rubber particles may also be obtained from reclaimed rubber by other well known methods, such as described in *Introduction to Rubber Technology*, Reinhold Publishing Corp., 1959.

An important aspect of the asphalt emulsion composition of the invention is the ratio of latex rubber:rubber particles. The presence of the rubber latex prevents separation of the rubber particles in the final asphalt emulsion composition as well as in the solids mix composition. Thus, it may be particularly advantageous and efficient to combine the latex rubber and rubber particles in the desired proportions when the solids mix is prepared. The latex rubber:rubber particle ratio is between about 1:1 and about 1:10, and preferably between about 1:2 and 1:5 and more preferably about 1:3 to about 1:5, by weight, respectively.

The solids mix composition preferably contains some water and preferably also a rheological agent or thixotropic agent. Water is desired to achieve a flowable, workable composition that can be conveniently handled and measured or metered and blended with the aqueous asphalt emulsion. Amounts of water between about 15% and about 50% by weight, achieve such a composition, typically in the form of a paste or slurry. A rheological or thixotropic agent is also preferably added as part of the solids mix composition to maintain the desired consistency and prevent solid particles from settling out in the mix.

Rheological agents, which may sometimes be referred to as thickeners or thixotropic agents, include the associative thickeners such as urethanes and nonionic surfactants, alkali swellable latex thickeners such as SBR and acrylic latexes, natural and modified natural thickeners including modified cellulose products, vegetable and seaweed gums, and starch products. Other rheological agents are the clays, hydrated lime, Portland cement, alkyl amines, polyacrylic resins, carboxyvinyl resins, polyethylene maleic anhydrides, polysaccharides, and the like. The use of Portland cement and/or hydrated lime as rheological agents is limited depending on the emulsifiers present in the emulsion. These agents act as a "set initiator" when used with a number of anionic emulsifiers, primarily the alphaolefin in sulfonates, as described in U.S. Pat. No. 4,193,816, and with most cationic emulsifiers. Thus, Portland cement and/or hydrated lime are used as thickeners in the compositions of the invention only with slow set emulsifiers as will be understood by those skilled in the art.

All of the rheological agent to be used in the final asphalt emulsion composition may be present in the solids mix composition. Alternatively, at least a portion of the rheological/thickening agent used may be added when blending the solids mix with the aqueous asphalt emulsion, and/or added when blending aggregate at the time of preparing a paving or construction composition. The amount rheological/thickening agent used in the solids mix will depend on the amount of water present, the type and ratio of solids present, and the selected viscosity range and physical consistency of the solids mix composition desired. Typically between about 1% and about 20%, by weight, is suitable.

In addition to the aforesaid rheological agents, the solids mix composition also preferably includes a surface active clay. Preferred clays comprise bentonite, especially sodium bentonite or sodium montmorillonite. Other clays having surface active properties may also be used, for example, hydrated aluminum silicate clays, kaolin, kaolinite, halloysite, and pyrophyllite and the hydrated magnesium silicate clays such as serpentine, chrysotile, asbestos and talc, and hydrated aluminum-magnesium silicates such as attapulgite and fuller's earth. Preferably, between about 0.5% and about 5% of the final emulsion, or up to about 10% of the solids mix composition, by weight, comprises a clay.

An optional ingredient of the solids mix composition is polymer fibers. Useful polymer fibers comprise natural, synthetic or semisynthetic fibers. Natural fibers include polysaccharides such as starch, cellulose, pectin, seaweed and vegetable gums. Synthetic fibers are both thermoplastic and thermosetting synthetic resins. Thermoplastic polymers include nylon, PVC, polyethylene, polystyrene, polypropylene, fluorocarbons, polyurethane and acrylic resins (acrylates). Thermosetting resins include cross-linked polyethylene, phenolics, alkyd and polyester resins. The semisynthetic polymer resin fibers are cellulosics including rayon, methylcellulose, cellulose acetate and modified starches. Any polymer fibers of the aforesaid type may be used. Preferred fibers are semisynthetic polymer fibers obtained from recycled materials such as used newsprint or other paper, cardboard, processed wood or similar processed cellulosic fiber materials. Useful fibers may be obtained from other recycle sources including ground up rubber tires which include tire carcass fibers such as nylon, polyester and rayon fibers. If used, fibers present in the solids mix may be in a rubber particle:polymer fiber ratio of between 1:99 and 99:1, respectively, by weight, although the amount of fibers is preferably between about 10% and 75% by weight.

Carbon black and/or graphite fibers may be added to the solids mix composition. Such material is conveniently added as a 50% aqueous solid dispersion of carbon black and used in an amount of between about 0.1% and about 10% by weight of said solids mix, or between about 0.1% and about 5.0%, by weight of the final liquid emulsion composition. Alternatively, the carbon black may be added separately when blending the solids mix and aqueous asphalt emulsion. Gilsonite may also be added as a component of the solids mix, in addition to, or instead of being added with the aqueous asphalt emulsion as previously described. Thus, from about 0.1% up to about 25%, by weight, of the solids mix may be gilsonite.

The solids mix composition to be added to and blended with the aqueous asphalt emulsion may be conveniently premixed, in part or in full, at ambient temperatures, i.e., 65°–75° F., and held as an admix material until such time as it is to be blended with the aqueous asphalt emulsion. Because of the physical nature of the solids mix composition, it can be stored in bulk, either dry or as a slurry or dispersion, without concern of deterioration. Preferably, the solids mix composition contains enough water to form a slurry which is easily handled and packaged for shipping as well conveniently divided or apportioned by weight or volume in desired quantities or portions for blending with the aqueous asphalt emulsion at or near the time the emulsion composition is to be used. The amount of solids mix composition added and blended with the aqueous asphalt emulsion to prepare an asphalt emulsion composition of the invention is between 1% and 99% by weight of the emulsion composition, preferably less than 50%, and more preferably less than 35%, by weight, of the final emulsion composition. However, the specific amount used will be depend on the specific solids mix ingredients used in preparing the product as well as the intended or desired use of the composition, for example, paving, roofing, carpet backing or binding, coating, waterproofing, etc.

Although a rheological or thickening agent is preferably present in the solids mix, additional amounts may be desired or necessary in blending the final emulsion composition. It will be understood that where the composition is to be used for paving, construction, or the like which requires the blending of aggregate with the asphalt emulsion, the viscosity change due to the presence of substantial amounts of aggregate are to be taken into consideration. However, preferably the viscosity of the asphalt emulsion composition, without the presence of aggregate, will be at least about 1,500 and preferably up to about 20,000 centipoise (cp) at ambient temperature (65° F.–75° F.). The amount of thickener used is typically between about 0.2 and about 2%, by weight, of the liquid emulsion composition. The thickener used may be any of the previously described rheological or thixotropic agents.

As previously noted, the solids mix composition comprising at least the rubber particles and/or other reclaimed rubber reaction products, and preferably also the latex, rheological agent, gilsonite, surface active clay and/or carbon black or graphite, and optionally polymer fibers is separately prepared, as is the aqueous asphalt emulsion which may also contain gilsonite, sulfur and/or latex. In mixing and blending the components of the final asphalt emulsion composition, a number of different combinations of materials and steps may be utilized within the purview of the invention. For example, the aforesaid ingredients may be all combined and mixed together at the same time to form the final asphalt emulsion composition. However, a solids mix composition in the form of an aqueous slurry is preferably mixed with the aqueous asphalt emulsion at the time and/or near the site where the asphalt emulsion composition is to be used. The components of the final asphalt emulsion composition are mixed in any suitable way in order to obtain the desired homogeneity, but preferably using a blender, such as a ribbon blender, or the like which gives sufficient agitation and yet full blending of the different components. Again, all mixing and blending may be carried out at ambient temperature, 65° F.–75° F. The amount of water present in the final composition may be minor or major, depending on the use. Typically, the amount of water is at least about 20%, up to about 50%, by weight. However, where necessary or desirable, greater or lesser amounts may be used. Preferably between about 1% and about 30% additional water, i.e., in excess of water present in the aqueous asphalt emulsion, is usually used in blending the final asphalt emulsion composition. The specific amount of water used can be adjusted to achieve the desired consistency, and preferably with the thickener provides the preferred viscosity of at least about 1,500 cp and up to about 20,000 cp at 65° F.–75° F., with the aforesaid amount of aqueous asphalt emulsion present. Additional emulsifier may be added, if necessary to maintain stabilization of the composition. However, where sufficient thickener is used to achieve desired viscosity of the composition the solids will remain substantially suspended whereby the consistency and homogeneity of the composition is stabilized without requiring added emulsifiers.

The final asphalt emulsion composition preferably contains between about 50%–80% aqueous asphalt emulsion, about 1%–5% latex rubber, 5%–25% solids mix composition and 1%–30% water, by weight. Again, the solids mix composition contains rubber and one or more of the aforesaid other ingredients. Latex rubber may comprise part of the solids mix composition, but in any event, the latex rubber: rubber particle ratio will be between about 1:1 and about 1:10, by weight, respectively, in the final emulsion composition. If the asphalt emulsion composition of the invention is to be used as a paving material or for certain construction uses, aggregate is added and thoroughly mixed to obtain the final composition. The aggregate may be any suitable aggregate including crushed rock, recycled glass, sand, graded silica, and the like, commonly used for such applications. The particle size of the aggregate is preferably #16 minus, U.S. Series, (16 mesh) i.e., will pass through a 16 mesh sieve, although for certain applications, larger particles may be used. However, preferably, to obtain the desired consistency, the aggregate materials should be no larger than #4 mesh. The amount of aggregate used in a paving composition is preferably between about 5 and about 20 pounds and more preferably between 8 and 15 pounds per gallon of the liquid composition. The viscosity of the composition changes when aggregate is added. Suitable paving composition viscosities are between about 5,000 and 50,000 and typically between 8,000 to 30,000 cp at ambient temperatures (65° F.–75° F.), depending on gradation of aggregate used. A portion of the aggregate added may comprise used asphalt, i.e., asphalt which is recycled and typically obtained from recycled asphaltic pavement (RAP), also known as recycled asphaltic concrete. The RAP particles to be used may be of any desirable selected size range within the aforesaid aggregate particle sizes. The aggregate is conveniently mixed with the aqueous asphalt emulsion and solids mix composition at the aforesaid ambient temperatures.

The following are examples of compositions of the invention. All percentages are given by weight.

EXAMPLE 1

A solids mix slurry composition comprises a mixture of 23.3% granulated recycled rubber tire particles 100% passing a #40 U.S. series sieve (i.e., "#40 minus"), 6.7% acrylic thickener (Carbopol® EP-1, BF Goodrich), 6.7% sodium bentonite clay, 16.6% SBR latex (Ultrapave UP-70®, Goodyear), 6.7% aqueous carbon black dispersion (50% solids) and 40% water, by weight. The slurry composition is mixed with 70% SS-1h aqueous asphalt emulsion to form a slurry seal emulsion which may be mixed with aggregate to prepare a composition used for coating pavements.

EXAMPLE 2

A solids mix slurry composition comprises a mixture of 31.2% #40 minus granulated recycled rubber tire particles, 0,7% acrylic thickener (Carbopol® EP-1), 7.2% sodium bentonite clay, 13% SBR latex (Ultrapave UP-70®), 5.2% aqueous carbon black dispersion (50% solids), 2.6% hydrated lime and 39% water. The slurry composition is mixed with 62% SS-1h aqueous asphalt emulsion to form a slurry seal emulsion.

EXAMPLE 3

A solids mix slurry composition comprises a mixture of 21% #40 minus granulated recycled rubber tire particles, 1.5% acrylic thickener (Paragum 165®, Para-Chem Southern, Inc.), 9% sodium bentonite clay, 6% SBR latex (Ultrapave UP-70®), 0.8% aqueous carbon black dispersion (50% solids), 0.8% hydrated lime and 60% water. The slurry composition is mixed with 67% SS-1h aqueous asphalt emulsion to form a slurry seal emulsion.

EXAMPLE 4

A solids mix slurry composition comprises 21% of #80 minus recycled rubber tire product (less than 15% hydrocarbon), 7% attapulgite clay, 14% neoprene latex (Neoprene 115 Latex, Du Pont), 5.6% aqueous carbon black dispersion (50% solids) and 50% water. The slurry composition is mixed with 50% CSS-1h (cationic) aqueous asphalt emulsion and 15% #50 minus aggregate at ambient temperature to form a useful construction seal emulsion.

EXAMPLE 5

A solids mix slurry composition comprises 3.2% recycled paper (1 mm or less fiber length), 6.4% #80 minus granulated recycled rubber tire particles, 4.8% sodium bentonite, 6.4% aqueous carbon black dispersion (50% solids), 3.2% acrylic thickener (Carbopol EP-1®) and 48% water. The slurry composition is mixed with CSS-1h or SS-1h aqueous asphalt emulsion and #50 minus aggregate at ambient temperature to form useful construction seal emulsions.

We claim:

1. A method of preparing an improved asphalt emulsion paving composition comprising:

mixing aggregate, an aqueous asphalt emulsion, water, polymer latex, reclaimed rubber particles passing through a 20 mesh U.S. series sieve and one or more solid addends selected from the group consisting of a rheological agent, gilsonite, carbon black, surface active clay and polymer fibers, and mixtures thereof wherein the ratio of polymer latex:rubber particles is between about 1:1 and about 1:10, by weight, respectively, and mixing the components at substantially ambient temperature.

2. The method of claim 1 including preparing said aqueous asphalt emulsion using gilsonite and asphalt whereby said aqueous asphalt emulsion comprises an asphalt phase comprising a mixture of asphalt and gilsonite in a ratio of asphalt:gilsonite of between about 99:1 and about 5:95, by weight, respectively, and a water phase comprising water and between about 0.05% and about 5%, by weight, of an emulsifying agent, wherein the ratio of asphalt phase: water phase is between about 3:1 and about 1:2, respectively, by weight.

3. The method of claim 2 wherein said aqueous asphalt emulsion is prepared by melting gilsonite, blending asphalt with the melted gilsonite to form a fluid mixture thereof, and blending said fluid mixture with water and an emulsifying agent to form said aqueous asphalt emulsion.

4. The method of claim 3 wherein said emulsifying agent is a cationic, anionic or non-ionic emulsifier.

5. The method of claim 2 wherein said aqueous asphalt emulsion is prepared by mixing gilsonite particles with asphalt at substantially ambient temperature to form a mixture thereof, and blending said mixture with water and an emulsifying agent to form said aqueous asphalt emulsion.

6. The method of claim 5 wherein said emulsifying agent is a cationic, anionic or non-ionic emulsifier.

7. The method of claim 1 wherein said aqueous asphalt emulsion is cationic, anionic or nonionic.

8. The method of claim 7 wherein said aqueous asphalt emulsion includes a surface active clay.

9. The method of claim 1 wherein said aqueous asphalt emulsion includes a surface active clay.

10. The method of claim 9 wherein said surface active clay comprises a bentonite clay.

11. The method of claim 1 wherein said polymer fibers are natural, synthetic or semisynthetic fibers.

12. The method of claim 1 wherein said polymer fibers comprise cellulosic fibers.

13. The method of claim 1 wherein said polymer fibers comprise synthetic polymer fibers.

14. The method of claim 1 wherein said rubber particles comprise reclaimed rubber processed to remove volatiles.

15. The method of claim 14 wherein said rubber particles comprise a mixture of carbon black and ash prepared by treating used rubber tires in the presence of a catalyst to remove substantial amounts of hydrocarbon, oils and metals therefrom.

16. An asphalt emulsion paving composition prepared by the method of claim 15.

17. A paving composition of claim 16 wherein said polymer latex is a latex rubber.

18. The method of claim 1 including adding a thickening agent during said mixing wherein the viscosity of said asphalt emulsion paving composition is between 1500 cp and 20,000 cp at 68° F.

19. An asphalt emulsion paving composition prepared by the method of claim 18.

20. A paving composition of claim 19 wherein said polymer latex is a latex rubber.

21. The method of claim 1 wherein a portion of said aggregate comprises recycled asphaltic concrete.

22. The method of claim 21 wherein said recycled asphaltic concrete comprises asphaltic concrete particles at least a portion passing a 16 mesh U.S. series sieve.

23. The method of claim 1 wherein said aqueous asphalt emulsion is prepared by mixing sulfur with asphalt and preparing an aqueous emulsion of the mixture.

24. The method of claim 23 wherein said sulfur and said asphalt are mixed above the melting point of sulfur.

25. The method of claim 24 including blending a liquid petroleum hydrocarbon with said asphalt and sulfur mixture, and forming an aqueous emulsion thereof.

26. An asphalt emulsion paving composition prepared according to the method of claim 1 containing a combination of said rubber particles and polymer fibers.

27. A method of claim 1 wherein said polymer latex is a latex rubber.

28. The method of claim 1 wherein at least a portion of the rubber particles will pass through a 40 mesh U.S. series sieve.

29. The method of claim 1 wherein the ratio of polymer latex:rubber particles is between 1:2 and 1:5, by weight, respectively.

30. An asphalt emulsion paving composition prepared according to the method of claim 29.

31. The method of claim 1 wherein said reclaimed rubber particles and said polymer latex are mixed prior to being mixed with said aqueous asphalt emulsion and said aggregate.

32. An asphalt emulsion paving composition prepared according to the method of claim 31.

33. The method of claim 1 wherein said reclaimed rubber particles and said one or more solids addends are blended to form a solids mix composition, and wherein said solids mix composition is mixed with said polymer latex, said aqueous asphalt emulsion and said aggregate to prepare said paving composition.

34. An asphalt emulsion paving composition prepared according to the method of claim 33 wherein the components thereof, excluding said aggregate, comprise:
 about 50%–80% aqueous asphalt emulsion,
 about 1%–30% water,
 about 1%–5% latex rubber, and
 about 5%–25% of said solids mix composition, and wherein the ratio of latex rubber:rubber particles is between about 1:1 and about 1:10, respectively,
 said amounts being by weight.

35. A composition of claim 34 wherein said solids mix composition comprises rubber particles and polymer fibers.

36. A composition of claim 35 wherein said polymer fibers comprise semisynthetic fibers from recycled newspaper.

37. A composition of claim 35 wherein said polymer fibers comprise synthetic fibers obtained from used rubber tires.

38. A composition of claim 37 wherein said solids mix composition includes between about 0.1% and about 10%, by weight, carbon black.

39. A composition of claim 34 wherein said solids mix composition includes a mixture of carbon black and polymer fibers prepared by treating used rubber tires.

40. A composition of claim 34 wherein said aqueous asphalt emulsion includes sulfur.

41. A composition of claim 40 wherein said aqueous asphalt emulsion comprises an asphalt phase having between about 50% and about 98%, by weight, paving grade asphalt and between about 1% and about 10%, by weight, added sulfur over the amount of any residual sulfur in said asphalt.

42. A composition of claim 41 wherein said asphalt phase includes between about 1% and about 35%, by weight, of a liquid petroleum hydrocarbon having a boiling point above about 200° F.

43. A composition of claim 34 wherein the ratio of latex rubber and rubber particles is between 1:2 and 1:5, by weight, respectively.

44. The method of claim 33 wherein at least a portion of said water is mixed with said reclaimed rubber particles and said one or more solid addends to form said solids mix composition.

45. An asphalt emulsion paving composition prepared according to the method of claim 44.

46. An asphalt emulsion paving composition prepared according to the method of claim 33.

47. The method of claim 1 wherein said reclaimed rubber particles, said one or more solid addends, and said polymer latex are blended to form a solids mix composition, and wherein said solids mix composition is mixed with said aqueous asphalt emulsion and said aggregate to prepare said paving composition.

48. The method of claim 47 wherein at least a portion of said water is mixed with said reclaimed rubber particles, said one or more solid addends and said polymer latex to form said solids mix composition.

49. An asphalt emulsion paving composition prepared according to the method of claim 48.

50. An asphalt emulsion paving composition prepared according to the method of claim 47.

51. An asphalt emulsion paving composition prepared according to the method of claim 1 wherein the components thereof, excluding said aggregate, comprise:

about 50%–80% aqueous asphalt emulsion, about 1%–30% water, about 1%–5% latex rubber, and about 5%–25% of said reclaimed rubber particles and said one or more solid addends, and wherein the ratio of latex rubber:rubber particles is between about 1:1 and about 1:10, respectively, said amounts being by weight.

52. A composition of claim 51 wherein said one or more solid addends comprises a rheological agent.

53. A composition of claim 51 wherein said one or more solid addends comprises polymer fibers.

54. An asphalt emulsion paving composition prepared according to the method of claim 1.

55. An asphalt emulsion composition prepared by mixing, at substantially ambient temperature:

a major amount of an aqueous asphalt emulsion, polymer latex, rubber particles passing a 40 mesh U.S. series sieve and natural, synthetic or semisynthetic polymer fibers wherein the ratio of polymer latex:rubber particles is between about 1:1 and 1:10, by weight, respectively.

56. A paving composition prepared by mixing the asphalt emulsion composition of claim 55 with aggregate at substantially ambient temperature.

57. A paving composition of claim 56 wherein said polymer latex is a latex rubber.

58. A paving composition of claim 56 comprising between about 5 and about 20 pounds of said aggregate per gallon of said asphalt emulsion composition.

59. A paving composition of claim 56 wherein said asphalt emulsion composition includes carbon black.

60. A paving composition of claim 59 wherein said polymer fibers comprise synthetic fibers and carbon black prepared by treating used rubber tires.

61. A solids mix composition comprising reclaimed rubber particles, at least a major amount of which pass a #20 U.S. series mesh, and latex rubber, wherein the ratio of said latex rubber:rubber particles is between about 1:2 and about 1:5, by weight, respectively, and one or more solid components selected from the group consisting of a rheological agent, gilsonite, carbon black, natural synthetic or semisynthetic fibers, and a surface active clay.

62. A solids mix composition of claim 61 including between about 1% and about 20%, by weight of a rheological or thixotropic agent capable of thickening an aqueous asphalt emulsion composition.

63. A solids mix composition of claim 62 including between about 0.1% and about 10% carbon black, by weight.

64. A solids mix composition of claim 63 including between about 0.1% and about 25% gilsonite, by weight.

65. A solids mix composition of claim 64 including between about 10% and about 75% polymers fibers, by weight.

66. A solids mix composition of claim 64 including between about 0.5% and about 10% surface active clay, by weight.

67. A solids mix composition of claim 66 including between about 15% and about 50% water, by weight.

68. A solids mix composition of claim 61 including between about 0.1% and about 10% carbon black, by weight.

69. A solids mix composition of claim 61 including between about 0.1% and about 25% gilsonite, by weight.

70. A solids mix composition of claim 61 including between about 10% and about 75% polymer fibers, by weight.

71. A solids mix composition of claim 61 including between about 0.5% and about 10% surface active clay, by weight.

72. A solids mix composition of claim 61 including between about 15% and about 50% water, by weight.

73. A solids mix composition of claim 61 wherein at least a portion of said reclaimed rubber particles comprises a mixture of ash and carbon black obtained by heating reclaimed rubber tires above about 300° F. in the presence of catalysts to separate hydrocarbons, oils, and metals.

74. A method of preparing an improved asphalt emulsion paving composition comprising:

mixing the solids mix composition of claim 61, water, aqueous asphalt emulsion and aggregate at substantially ambient temperature.

75. An asphalt emulsion paving composition prepared according to the method of claim 74.

* * * * *

UNITED STATES PATENT AND TRADEMARK OFFICE
CERTIFICATE OF CORRECTION

PATENT NO. : 5,811,477
DATED : September 22, 1998
INVENTOR(S) : Michael V. Burris and Bryan B. Burris It is certified that error appears in the above-identified patent and that said Letters Patent is hereby corrected as shown below:

Column 6,
Line 3, the expression "i.e." should read -- e.g. --
Line 36, the expression "(65° F.-75° F.)" should read -- (e.g., 65° F.-75° F.) --
Line 63, the expression "65° F.-75° F." should read -- e.g., 65° F.-75° F. --

Column 7,
Line 41, the expression "(65° F.-75° F.)" should read -- (e.g., 65° F.-75° F.) --

Signed and Sealed this

Fourteenth Day of January, 2003

JAMES E. ROGAN
*Director of the United States Patent and Trademark Office*